US006946176B2

United States Patent
Jousse et al.

(10) Patent No.: US 6,946,176 B2
(45) Date of Patent: Sep. 20, 2005

(54) MULTILAYER THERMOPLASTIC STRUCTURE FOR GAS TANK

(75) Inventors: Franck Jousse, Tours (FR); Philippe Mazabraud, Orleans (FR); Béatrice Icard, Tencin (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 10/344,819

(22) PCT Filed: Aug. 27, 2001

(86) PCT No.: PCT/FR01/02675

§ 371 (c)(1),
(2), (4) Date: Feb. 14, 2003

(87) PCT Pub. No.: WO02/18135

PCT Pub. Date: Mar. 7, 2002

(65) Prior Publication Data

US 2003/0175457 A1 Sep. 18, 2003

(30) Foreign Application Priority Data

Aug. 30, 2000 (FR) .............................. 00 11073

(51) Int. Cl.⁷ .................. B29D 22/00; B29D 23/00; B32B 1/08
(52) U.S. Cl. .................. 428/36.7; 428/35.7; 428/36.6; 428/367; 428/332; 428/339
(58) Field of Search ............. 428/34.1, 35.7, 428/36.6, 36.7, 476.3, 475.8, 213, 500, 523, 475.5, 476.1, 474.4, 332, 337, 338, 339, 215, 516, 517, 518, 721, 422; 220/567.2, 562, 581, 585, 660

(56) References Cited

U.S. PATENT DOCUMENTS

| 4,810,457 | A | * | 3/1989 | Kersting | 264/544 |
| 4,810,542 | A | * | 3/1989 | Kawai et al. | 428/36.7 |
| 5,055,355 | A | * | 10/1991 | DeAntonis et al. | 428/476.3 |
| 5,230,935 | A | | 7/1993 | Delimoy et al. | |
| 6,033,749 | A | * | 3/2000 | Hata et al. | 428/36.7 |
| 6,083,587 | A | * | 7/2000 | Smith et al. | 428/36.6 |
| 6,214,426 | B1 | * | 4/2001 | Kawachi et al. | 428/36.6 |

FOREIGN PATENT DOCUMENTS

| EP | 0 230 344 A2 | 7/1987 |
| FR | 2 733 296 | 10/1996 |

* cited by examiner

Primary Examiner—Michael C. Miggins
(74) Attorney, Agent, or Firm—Oblon, Spivak, McClelland, Maier & Neustadt, P.C.

(57) ABSTRACT

A multi-layer thermoplastic structure that has at least one layer that is between 0.3 and 20 mm thick and is made of an ethylene-vinyl alcohol copolymer with a density of between 0.94 and 1.4, and a melt flow index of between 1.3 and 4.2 g/10 minutes at a temperature between 170 and 240 degree C. The multi-layer thermoplastic structure is obtained by rotation moulding and is of particular benefit when functioning as a gas tank.

14 Claims, 2 Drawing Sheets

MULTILAYER THERMOPLASTIC STRUCTURE FOR GAS TANK

TECHNICAL DOMAIN

Figure 1:
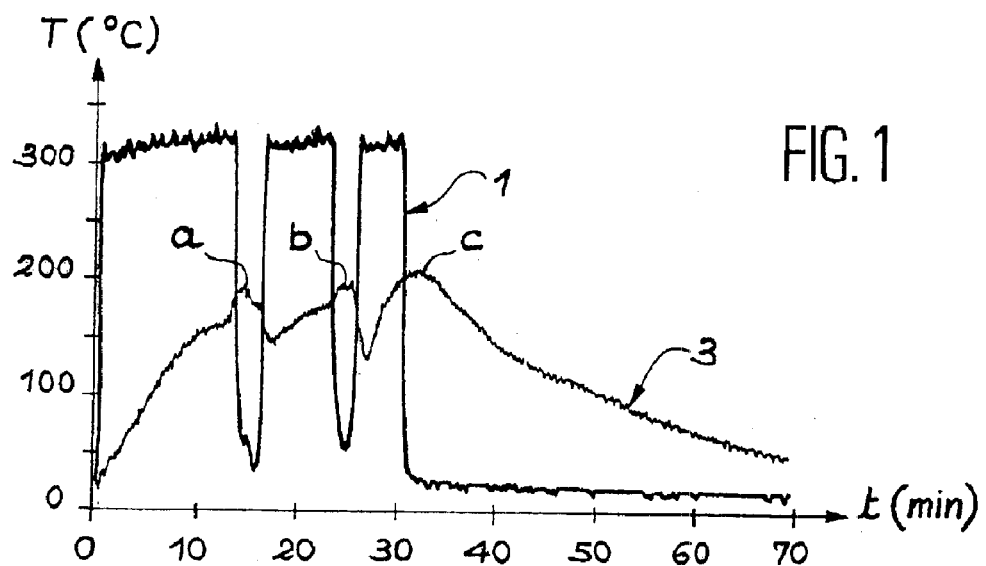

The present invention relates to a multi-layer thermoplastic structure, use of the said structure for manufacturing a tank, and a tank comprising the said structure.

This invention is related particularly to a seamless multilayer structure of revolution such as a tank made of a plastic material, particularly intended for the storage of solvents or a gas under pressure such as hydrogen, oxygen, hydrocarbons, etc.

STATE OF PRIOR ART

At the present time, most tanks used for high pressure storage of gas are all-metallic, or composed of a leaktight aluminium alloy bladder around which a carbon/resin composite is sometimes wound acting as mechanical reinforcement to resist high pressures, or a thermoplastic bladder around which a carbon/resin composite is sometimes wound acting as mechanical reinforcement to resist high pressures.

The first type of tank has disadvantages related to the problem of their weight and corrosion of metal.

The second type of tank has disadvantages related to the use of leaktight aluminium bladders. It uses expensive technologies such as flow turning. Furthermore, embrittlement of aluminium particularly due to corrosion in the presence of pressurized hydrogen gas is a big problem since it shortens the life of the tank.

For the third type of tank, the thermoplastic bladders used at the moment are mainly made of polyethylenes that may or may not be chemically cross-linked, polypropylenes, polybutadiene terephthalates, polyethylene terephthalates, polyamides such as Nylon 6 or 11 or mixes of polypropylene or polybutene. These tanks that comprise a thermoplastic bladder are not necessarily intended for the storage of permeating gases such as gases other than compressed air, particularly high pressure gases and their leakage rate is too high for gases such as hydrogen. Most existing manufacturing protocols use polyethylenes, polyvinyl chlorides, polyurethanes, vinyl acetate copolymers and polystyrenes, in addition to the materials mentioned above. These protocols, and particularly rotation moulding, recommend the use of these thermoplastic polymers with fairly low viscosities and a density of between 0.924 and 0.939 and a fluidity index of between 3 and 9 g/10 minutes. The grade is a commercial name; for a polymer, there may be several commercial grades, in other words with a different cristallinity or different masses or different chain lengths, etc.

For example, rotation moulding of multi-layers in industry essentially concerns polyethylene/polyethylene or polyethylene/polyurethane foam/polyethylene type structures. More engineering thermoplastics and particularly in the ethylene-vinyl alcohol copolymers family have never been used. This latter copolymer has been used by injection or extrusion for applications in packaging or in food processing or cosmetics. In these applications, they have been used in thin values, less than 500 μm.

Furthermore, technologies for the use of tanks according to prior art require seams to obtain shapes of revolution and/or to add inserts, for example such as handles or metal connections, for example such as caps or sensors. These seams make the bladders non-homogenous and increase their leakage rate.

Therefore, there is a real need for a structure for making tanks that are lighter weight than the state of the art, reducing manufacturing costs and increasing the life of the tanks made.

Furthermore, for storage applications, for example such as gas tanks, there is a need for seamless and homogeneous structures of revolution with properties such as improved impermeability to gases, mechanical strength, resistance to irradiations and solvents, etc.

The leakage rate through this type of tank must be reduced, for example so that they can be used for the storage of high pressure gases such as hydrogen.

PRESENTATION OF THE INVENTION

The purpose of this invention is precisely a structure and a reservoir comprising the said structure that overcome the disadvantages and have the qualities mentioned above.

The structure of this invention is a multi-layer thermoplastic structure comprising at least one layer composed of an ethylene-vinyl alcohol copolymer with a density of between 0.94 and 1.4, for example between 1.10 and 1.22 and a melt flow index between 1.3 and 4.2 g/10 minutes, for example between 1.5 and 4 g/10 minutes at a temperature of 170 to 240° C., for example 180 to 230° C.

The ethylene-vinyl alcohol copolymer will also be referred to as EVOH in the following.

According to the invention, the ethylene-vinyl alcohol copolymer may also be defined as having the following formula:

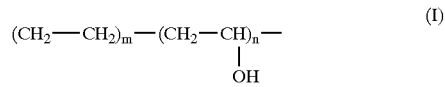

where m is between 10 and 80% in moles in the polymer, or between 20 and 80% in moles.

The melt flow index of the ethylene-vinyl alcohol copolymer is determined according to the ASTM D 1238-88 standard using a test carried out on a Kayeness Galaxy 1 machine (trademark) model 7053 DE made by the Kayeness Inc. company, Morgantown, Pa. 19543. This test consists of placing a polymer filler on a tube placed at a defined temperature, greater than the polymer melting temperature, and measuring the polymer quantity that flows during 30 seconds. This time is then converted into minutes.

EVOH polymers are usually commercially available in the form of pellets. Preferably, the commercial pellets are previously micronized into a powder, for example at ambient temperature or cryogenic temperature, and the size grading is chosen depending on the nature of the polymers and the envisaged multi-layer structure, preferably having a size grading smaller than 0.7 mm, and advantageously between 0.1 and 0.7 mm. This micronization avoids the need to heat the EVOH excessively to melt it afterwards, while providing a homogenous layer.

Furthermore, the EVOH grade chosen according to this invention preferably has a lower melt flow index, in other words greater viscosity, than that of thermoplastics such as PE, PVC, PA that are normally rotation moulded. In other words, according to the invention, EVOH remains very viscous in the molten state so that it can be deposited in thicknesses of more than 0.5 millimetres, which is contrary to the requirements in normal rotation moulding protocols in which fairly fluid thermoplastic grades are usually required.

The EVOH thermoplastic absorbs a lot of water which reduces its mechanical, rheological and gas barrier properties. Thus, multi-layer structures according to this invention are preferred in order to protect the EVOH from water, for example by means of layers of water resistant thermoplastic materials other than EVOH. This was not done in prior art since rheological characteristics such as viscosity, fluidity, etc., and physicochemical characteristics such as fusion, polarity, degradation temperature, etc. of the layers of thermoplastic materials other than EVOH used in prior art for rotation moulding are sometime very different from each other.

This invention overcomes this problem, particularly by the selection of an appropriate grade of EVOH which remains viscous in the molten state, and by the choice of its application temperature which is slightly higher than its melting temperature. This gives a thick layer of EVOH and prevents thermoplastic material layers other than EVOH that are adjacent to it from mixing with it, so that it can be superposed with other thermoplastic materials.

This invention also has the advantage that multiple layers can be deposited without it being necessary to reduce the equipment temperature during application of the various layers of thermoplastic materials. Thus for example, unlike the state of the art, the temperature of an internal thermoplastic layer, in other words the final deposited layer may be greater than the temperature of the previous layer of thermoplastic material, in other words the first layer made, without any interpenetration of the layers.

EVOH is a polymer with good mechanical properties and it forms an excellent barrier to gas. But some gases such as helium and hydrogen are known for being very permeating. Furthermore, their storage pressure may be high, up to $10^6$ to $10^8$ Pascals, which encourages their permeation. These specifications make it necessary for the EVOH barrier to be thick and all thermoplastic/connection interfaces must be leaktight to minimize the leakage rate from the tank. Surprisingly, with the structure according to the invention and the EVOH characteristics above mentioned, it is possible to make a sufficiently thick layer of EVOH so that it can be used to make a tank with the required qualities for storage of such gases at the above mentioned pressures.

EVOH may tend to absorb a lot of water, which reduces its properties particularly as a barrier to gases. This is why the EVOH layer will preferably be used in multi-layer structures, so that layers of thermoplastic materials on each side of the EVOH layer protect it from water.

According to the invention, the layer composed of the said ethylene-vinyl alcohol copolymer may be thicker than 0.5 mm, for example between 0.3 and 20 mm thick, or between 0.5 and 10 mm thick, or even between 0.5 and 5 mm thick. An increased thickness of the EVOH layer improves the properties of the material. Depending on the envisaged applications, it will be chosen particularly as a function of the required cost, weight, mechanical strength, nature of the gas, storage pressure, storage conditions, allowable leakage rate, etc.

According to the invention, the structure may also comprise at least one layer composed of a thermoplastic material different from the said ethylene-vinyl alcohol copolymer and chosen from a group comprising a polyethylene (PE), a grafted polyethylene (PEG), a terephthalate polyethylene (PET), a polypropylene (PP), a polyetheretherketone (PEEK), a polycarbonate (PC), an ethylene vinyl acetate (EVA) copolymer, a polystyrene (PS), a polyvinylidene fluoride (PVDF), an amide polyester, a polyamide (PA), a polyarylamide (PAA) or a mix of these thermoplastic materials.

When there are several layers of thermoplastic materials like those mentioned above, different from the said ethylene-vinyl alcohol copolymer, the materials in the different layers may be identical or different.

According to the invention, the structure may for example comprise at least a first and a second layer composed of first and second identical or different thermoplastic materials respectively, other than an ethylene-vinyl alcohol copolymer, for example selected from the above mentioned materials, the said structure comprising, in sequence, the first layer of thermoplastic material, the layer composed of ethylene-vinyl alcohol copolymer, and the second layer of thermoplastic material.

For example, the first layer may be composed of polyamide and the second layer may be composed of grafted or ungrafted polyethylene.

Also for example, the first and the second layers may be composed of an identical or different polyamide.

According to the invention, each layer of thermoplastic material different from the said ethylene-vinyl alcohol copolymer may for example be between 0.1 and 10 mm, or between 0.1 and 5 mm thick.

The layers of thermoplastic materials other than ethylene-vinyl alcohol copolymer may also participate in resisting shocks on the EVOH layer, and therefore the formed tank.

According to the invention, an organic or mineral filler may be added to the thermoplastic material that forms the layer composed of a thermoplastic material other than the said ethylene-vinyl alcohol copolymer. This filler may for example be useful to improve the mechanical strength, the resistance to aging or to facilitate use of the structure.

The structure according to the invention may be made by any process enabling a deposit of one or several successive layer(s), for example by moulding, cold plasma spraying, extrusion, injection, blowing, thermoforming or rotation moulding. If this invention is used to make a high pressure tank, the application process used to make the tank shall preferably be capable of obtaining a sufficiently thick layer of EVOH so that the structure of this invention is sufficiently gas tight to gases at high pressure and/or at high temperature.

Unexpectedly, the rotation moulding technique according to this invention can produce multi-layers with an EVOH layer more than 0.5 millimetres thick. It also makes it possible to put inserts and/or connections into the structure during manufacturing and advantageously providing a seamless tank that is sufficiently leaktight to gases at high pressure and/or high temperature. Any other technique for obtaining this type of bladder is suitable.

According to this invention, the layer of EVOH may be used at a temperature slightly higher than its melting temperature, up to 230/240° C. with a thickness that can be more than 0.5 mm which is innovative compared with the state of the art. This means that thermoplastic layers can be stacked on the EVOH layer regardless of their melting and/or application temperatures, whereas the state of the art recommends that the application temperature of subsequent layers should be reduced to prevent interpenetration of the layers.

The thermoplastic structure according to this invention may be reinforced by a fibres composite, for example carbon or silica impregnated by thermosetting resin such as epoxy or phenolic resin, possibly but not necessarily being thermally cross-linked, or a thermoplastic such as an alloy or a polyarylamide, in order to improve resistance to high gas storage pressures. This reinforcement may for example be placed in or outside the multi-layer structure. To achieve this, the bladder may for example act as a mandrel for laying up or for weaving carbon wires that are then impregnated with thermosetting resin. The assembly may be subjected to heat treatment to cause cross-linking of the resin.

Any other process for internal or external mechanical reinforcement of the multi-layer thermoplastic bladder would be suitable.

Therefore, this invention also relates to a tank with improved gas barrier and mechanical strength properties, starting from structures or thermoplastic bladders according to this invention, as follows:

multi-layer structures improving the resistance of EVOH to the environment and its shock resistance;

structures with a thick EVOH layer, in other words thicker than 500 microns, to provide a sufficient barrier to gases;

seamless structures to provide a homogeneous bladder with a uniform mechanical strength and permeation;

structures in which inserts or connections are fitted during manufacture of the bladder, if necessary, to limit risks of leakage.

Therefore the purpose of this invention is use of multi-layer structures comprising at least one layer made of ethylene-vinyl alcohol (EVOH) copolymer defined above for making a tank.

The EVOH layer according to this invention forms an excellent barrier to gases, even to hydrogen. For example, with this structure, tanks can be made for the storage of high pressure gases such as hydrocarbons, hydrogen, oxygen, etc.

Therefore a thick EVOH layer is used as a key layer in thermoplastic structures or bladders according to this invention for the storage of gas. This type of structure can be used for storage at a pressure of $10^6$ to $10^8$ Pa or even more, and at a storage temperature from −50° C. to +100° C. The gain in terms of the leakage rate for a tank according to this invention is equal to a factor of at least 30 compared with other thermoplastic polymers.

Therefore, there are many applications of this invention and some apart from those mentioned above include H2 tank applications for fuel cells in which the tank may be subjected to temperatures varying from −40 to 160° C. and pressures from 200 to 600×$10^5$ Pa.

Other applications include all applications that make use of the properties and advantages of the structure according to this invention, as mentioned above.

Other characteristics and advantages will become clear after reading the following examples given for illustrative purposes and in no way limitative, with reference to the attached figures.

FIGURES

FIG. 1 is a graphic view of the temperature variation of a temperature sensor placed on the outside of the rotation moulding mould and the temperature of the atmosphere inside the rotation moulding furnace, as a function of the time in minutes during manufacture of a three-layer part of revolution made of 1 mm polyamide PA12/2 mm ethylene vinyl alcohol/1 mm grafted polyethylene, using the process according to this invention.

Figure 2:
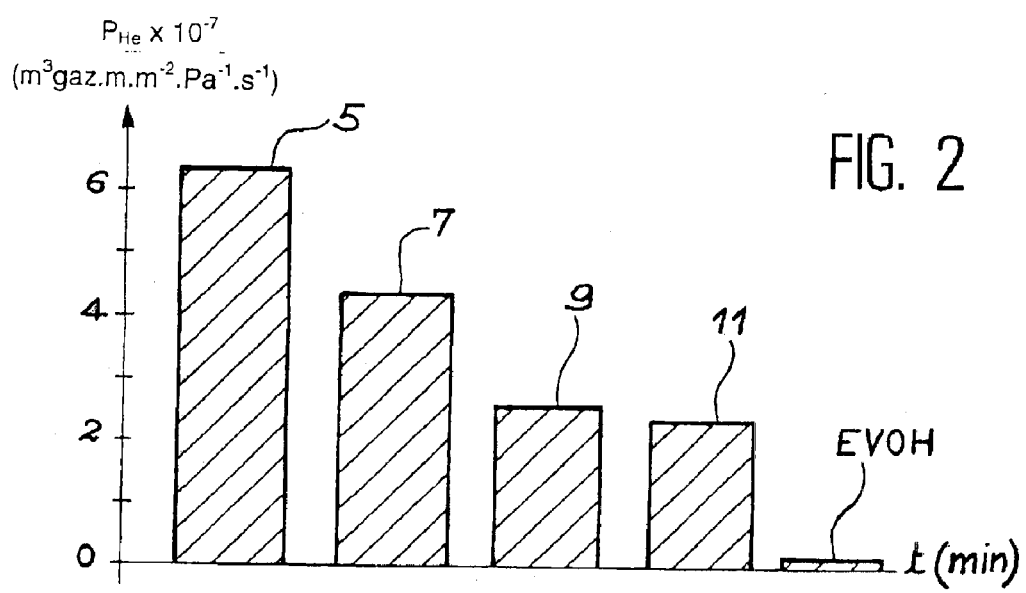
Figure 3:
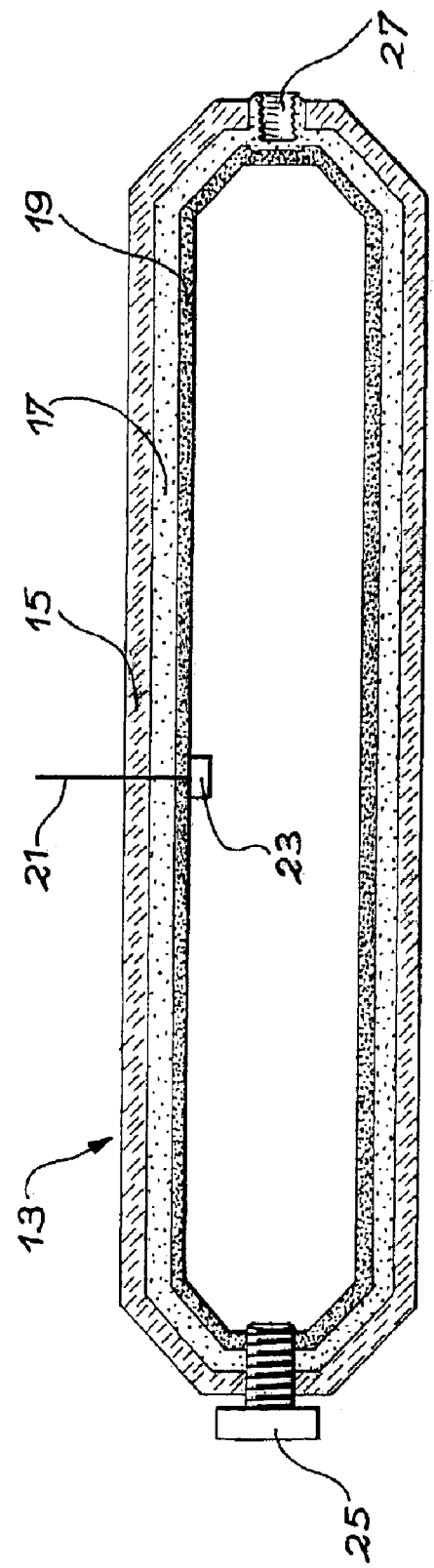

FIG. 2 is a graph showing the permeation of helium gas at 60° C. through different 2 mm thick thermoplastic polymers including EVOH according to this invention, and FIG. 3 is a diagrammatic view of a tank according to this invention.

EXAMPLES

Example 1

A thermoplastic 3-layer structure composed of a 1 mm thick layer of polyamide 12 (PA 12) RISLAN (trademark), commercial grade ARVO 950 TLD made by the TOTAL-FINA-ELF company, a 2 mm thick layer of ethylene-vinyl alcohol (EVOH) copolymer SOARNOL (trademark), commercial grade D 2908, made by the NIPPON GOHSEI company, and a 1 mm thick layer of grafted polyethylene (grafted PE) OREVAC (trademark), commercial grade 18350 P made by the TOTAL-FINA-ELF company, was used as a leaktight bladder for a tank for the storage of hydrogen at 60° C. and 350 bars.

The bladder was manufactured by rotation moulding. The theoretical melting temperatures for these three thermoplastics are $T_{PA12}$=170° C., $T_{EVOH}$=180° C. and $T_{graftedPE}$=130° C., respectively.

The main parameters in terms of rotation moulding cycle time and temperature used are shown in FIG. 1 attached. This is a graphic view of the temperature variation of a temperature sensor placed on the outside of the rotation moulding mould, curve 1, and the temperature of the atmosphere inside the rotation moulding furnace, curve 3 in ° C., as a function of the time in minutes during manufacturing of the structure according to this invention. On this figure, the temperature increases a), b) and c) correspond to the first, second (EVOH) and third layers of thermoplastic polymers, respectively.

The successive application temperatures for the different layers are 180° C., 190° C. and 200° C. Although the first layer of PA12 melts again at 200° C., there is no interpenetration with the EVOH layer since although it is also melted, it remains very viscous and thick at 200° C. Although the melting temperature of the grafted PE is about 130° C., it has to be applied at high temperature, in other words at a temperature of more than 180° C., in this case 200° C., to eliminate the bubbles formed.

The bladder is reinforced during manufacturing by a composite of carbon fibres impregnated with thermally cross-linked epoxy resin.

Chemical bonding between the three layers is possible by selection of three polar polymers that ensure good mechanical resistance of the assembly.

EVOH pellets were micronized in advance using a WEDCO type equipment (trademark) to make a 400-micron powder that was then dried.

The rotation moulder used is of the CACCIA type (trademark) provided with a gas furnace and on which the ROTOLOG software (trademark) is installed. The mould used is made of aluminium, and the internal lining is covered with Teflon (trademark). The biaxial rotation speed of the rotation moulder is 5.4 rpm for the primary shaft and 7.3 rpm for the secondary shaft.

The tank obtained is shown diagrammatically in FIG. 3 attached. In this figure, the tank 13 is composed of the above-mentioned rotation moulded three-layer structure; an external polyamide layer reference 15, an ethylene-vinyl alcohol copolymer layer reference 17, and a grafted polyethylene layer reference 19. It also comprises a pressure sensor type connector 21 connected to a sensor 23, a cap type insert 25, and a metal screw thread or handle type insert 27.

The tank is made in the shape of a cigar with a length of about 1 m and an inside radius of about 100 mm. The internal volume is 35 litres and the developed inside surface area is 0.75 m².

The annual leakage rate by natural permeation of gas through the multi-layer bladder of the tank is less than 1% by volume as a proportion of the volume of the expanded gas, in other words under normal temperature and pressure conditions.

Example 2

The same process as that described in example 1 was used to make a thermoplastic three-layer structure with the same geometry as in example 1 but composed of a 0.5 mm thick of polyamide 12 (PA 12) RISLAN (trademark) commercial grade ARVO 950 TLD made by the TOTAL-FINA-ELF company, a 3 mm thick layer made of ethylene-vinyl alcohol copolymer (EVOH) SOARNOL (trademark) commercial grade D 2908 made by the NIPPON GOHSEI company, and a 0.5 mm thick inner layer of polyamide 12 (PA 12) RISLAN (trademark), commercial grade ARVO 950 TLD made by the TOTAL-FINA-ELF company.

This three-layer structure was used as a leaktight bladder for a tank like that shown diagrammatically in FIG. 3 for the storage of helium at 25° C. and 350 bars.

The annual leakage rate by natural permeation of gas through the multi-layer bladder of the tank is less than 5% by volume as a proportion of the volume of the expanded gas, in other words under normal temperature and pressure conditions.

Example 3

Process illustrated in examples 1 and 2 was used to make a thermoplastic 3-layer structure the same shape as in examples 1 and 2, but composed of a 0.7 mm thick layer of grafted polyethylene (grafted PE) OREVAC (trademark), commercial grade 18350 P made by the TOTAL-FINA-ELF company, a 2 mm thick layer of ethylene-vinyl alcohol (EVOH) copolymer SOARNOL (trademark), commercial grade D 2908, made by the TOTAL-FINA-ELF company, and a 0.7 mm thick layer of grafted polyethylene (grafted PE) OREVAC (trademark), commercial grade 18350 P made by the TOTAL-FINA-ELF company.

This three-layer structure was used as a leaktight bladder for a tank like that shown diagrammatically in FIG. 3 for the storage of helium from 40° C. to +60° C. and 700 bars.

The annual leakage rate by natural permeation of gas through the multi-layer bladder of the tank is less than 1 cm³ per litre of the tank and per hour, under 700 bars pressure and at ambient temperature.

Comparative Example 1

FIG. 2 contains a graph showing permeation of helium gas $P_{He} \times 10^{17}$ (m³ gas.m.m$^{-2}$.Pa$^{-1}$.s$^{-1}$) at 60° C. through different 2 mm thick thermoplastic polymers, including EVOH according to this invention.

On this figure, the following references indicate the following polymers:

| | |
|---|---|
| 5 | low density polyethylene (LDPE) |
| 7 | polyamide 12 (PA 12) |
| 9 | polyvinylidene fluoride (PVDF) |
| 11 | cross-linked polyethylene (XLDPE) |
| EVOH | ethylene-vinyl alcohol copolymer (EVOH) |

There is no doubt that EVOH has the best gas barrier properties of all the thermoplastic polymers studied.

What is claimed is:

1. A multi-layer thermoplastic structure comprising at least one layer having a thickness between 2 and 20 mm and wherein said at least one layer consist of an ethylene-vinyl alcohol copolymer with a density of between 0.94 and 1.4, and a melt flow index measured according to an ASTM standard 1238 equal to between 1.3 and 4.2 g/10 minutes at a temperature between 170 and 240° C.

2. The multi-layer structure according to claim 1, wherein the thickness of the at least one layer is between 2 and 5 mm.

3. The multi-layer structure according to claim 1, further comprising at least one other layer made of a thermoplastic material selected from the group consisting of a polyethylene (PE), a grafted polyethylene, a polyethylene terephthalate, a polycarbonate, an ethylene vinyl acetate copolymer, a polyvinylidene fluoride, an amide polyester, a polyamide, or a mix of these thermoplastic materials.

4. The multi-layer structure according to claim 3, wherein the at least one other layer is between 2 and 10 mm thick.

5. The multi-layer structure according to claim 3, wherein the at least one other layer is between 2, and 5 mm thick.

6. The multi-layer structure according to claim 3, wherein an organic or mineral filler is added to the at least one other layer.

7. The multi-layer structure according to claim 3, further comprising at least a first layer made of a first thermoplastic material other than the ethylene-vinyl alcohol copolymer of the at least one layer and a second layer made of a second thermoplastic material other than the ethylene-vinyl alcohol copolymer of the at least one layer, wherein the first and second thermoplastic materials may be identical or different, wherein the first layer and the second layer are arranged on opposite sides of the at least one layer.

8. The multi-layer structure according to claim 7, wherein the first thermoplastic material is a polyamide and the second thermoplastic material is a grafted or ungrafted polyethylene.

9. The multi-layer structure according to claim 7, wherein the first and second thermoplastic materials are an identical or different polyamide.

10. A multi-layer thermoplastic structure comprising:
   at least one layer consisting of an ethylene-vinyl alcohol copolymer with a density of between 0.94 and 1.4, and a melt flow index measured according to the ASTM standard 1238 equal to between 1.3 and 4.2 g/10 minutes at a temperature between 170 and 240° C., in which the layer composed of the ethylene vinyl alcohol copolymer is between 2 and 20 mm thick; and
   a reinforcing composite of carbon wires impregnated with thermally cross-linked epoxy resin.

11. The multi-layer structure as in any one of the preceding claims, obtained by rotation moulding.

12. Use of the multi-layer structure as in any one of claims 1–10 for making a tank.

13. A gas tank comprising the multi-layer structure as in any one of claims 1–10.

14. The use according to claim 12, wherein the tank being made is a hydrogen tank.

* * * * *

UNITED STATES PATENT AND TRADEMARK OFFICE
CERTIFICATE OF CORRECTION

PATENT NO. : 6,946,176 B2
DATED : September 20, 2005
INVENTOR(S) : Jousse et al.

It is certified that error appears in the above-identified patent and that said Letters Patent is hereby corrected as shown below:

<u>Title page,</u>
Item [45] should read as follows:
-- [45] **Date of Patent: *Sep. 20, 2005** --.
Item [*] should read as follows:
-- [*] Notice: Subject to any disclaimer, the term of this
patent is extended or adjusted under 35
U.S.C. 154(b) by 0 days.

This Patent is subject to a terminal disclaimer. --.

Signed and Sealed this

Fifteenth Day of November, 2005

JON W. DUDAS
*Director of the United States Patent and Trademark Office*